Sept. 17, 1935.     E. C. SPARLING     2,014,818
VOLTAGE AND FREQUENCY REGULATOR
Filed May 12, 1934
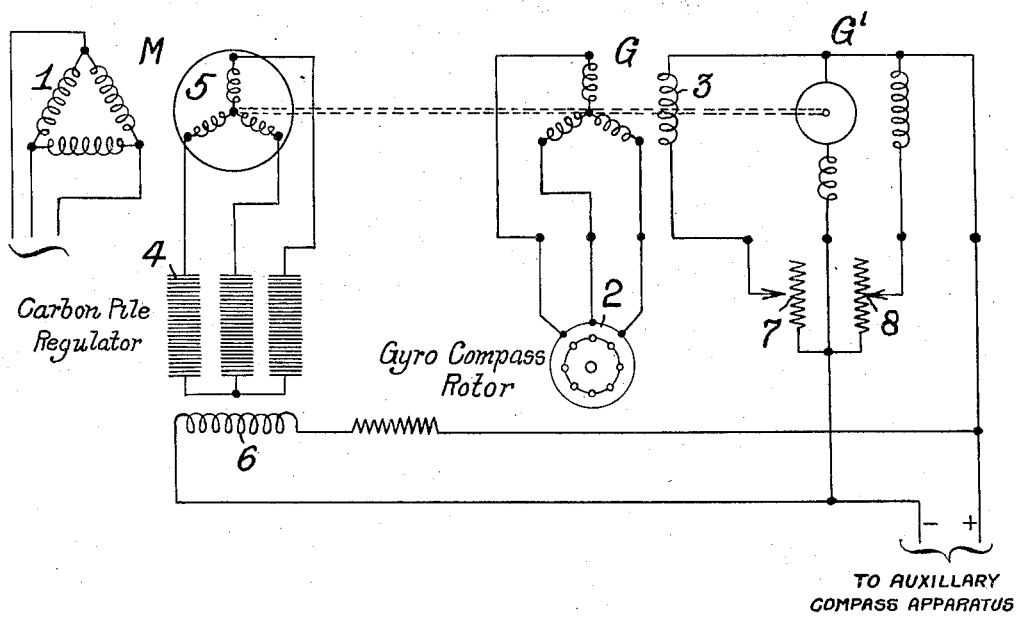
INVENTOR
Eric C. Sparling
BY
Herbert H. Thompson
HIS ATTORNEY.

Patented Sept. 17, 1935

2,014,818

UNITED STATES PATENT OFFICE 2,014,818

VOLTAGE AND FREQUENCY REGULATOR

Eric C. Sparling, Garden City, N. Y., assignor to Sperry Gyroscope Company, Inc., Brooklyn, N. Y., a corporation of New York Application May 12, 1934, Serial No. 725,224

4 Claims. (Cl. 171—312)

This invention relates to a motor generator set for automatically maintaining a constant voltage and frequency of the output current for special purposes irrespective of variations that may occur in the main A. C. supply which drives the motor. For the supplying of current to gyro compasses, especially of the naval type, it is very important that the three-phase supply to the rotor be held at constant voltage and constant frequency, the voltage and frequency on the ship usually being variable and also of a different value from that required by the compass. Also it is necessary to supply a certain amount of direct current for actuating the auxiliary compass apparatus, the voltage of which it is necessary to maintain constant. Both of these purposes may be accomplished in an extremely simple manner by applicant's invention.

The drawing shows a wiring diagram of a typical motor generator set for supplying current for a gyro compass. The motor is shown at M, an A. C. generator at G and a D. C. generator at G'. The motor is shown as of the three-phase wound rotor induction type in which the stator 1 is supplied with the three-phase ship's supply. Preferably two generators G and G', or a double current generator, are employed to supply both three-phase alternating current for the gyro compass rotor 2 and direct current for the auxiliary apparatus. As shown, the direct current generator also supplies current for exciting the field 3 of the generator G.

For regulating the speed of the motor M to maintain the voltage and frequency of the generators constant, I have shown variable resistances 4 in circuit with the closed winding on the rotor 5 of the motor. These resistances are shown in the form of three carbon pile resistances, one in series with each winding of the rotor, the resistance of which may be readily varied by the pressure exerted on the pile. The pressure, in turn, is controlled by solenoid 6 in circuit with the output of one of said generators, preferably the D. C. generator G'. Such carbon pile regulators are well known in the art and need not be described in detail. The carbon pile regulator will vary the pressure on the carbons according to the voltage impressed on the control solenoid, thus varying the resistance in the wound rotor circuit of the induction motor so as to maintain a constant speed of the motor generator. For instance, if the frequency or voltage of the supply increases, the motor speed would normally be increased, but a slight increase in speed will increase the D. C. voltage, which will increase the current in the coil 6, which will in turn increase the carbon resistance and the slip of the induction motor, thus slowing down the motor until normal speed and output voltages are again obtained.

The regulated speed for the set must, of course, be chosen slightly below that which an induction motor would run on the minimum expected frequency of the variable supply since this arrangement will only serve to reduce the speed to the required value. The initial adjustment of the voltage output of the two generators may be obtained by variable field rheostats 7 and 8, and the initial adjustment of regulated speed may be obtained by adjustments of the carbon pile regulator.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. Means for providing a constant voltage, constant frequency supply for A. C. and D. C. electrical instruments, from a variable A. C. supply comprising a motor generator set adapted to be driven from said supply including an induction motor, a variable resistance in the rotor circuit thereof, an A. C. generator for supplying a constant voltage and constant frequency to an A. C. instrument load, and a D. C. generator for supplying a constant voltage to a D. C. instrument load, the latter generator being connected for exciting the field of the former, and means responsive to variations in the voltage generated by one of said generators for varying said resistance to maintain the speed of said motor constant.

2. Means for providing a constant voltage, constant frequency supply for A. C. and D. C. electrical instruments from a variable A. C. supply comprising a motor generator set adapted to be driven from said supply including an induction motor, a variable carbon pile resistance in the rotor circuit thereof, an A. C. generator and a D. C. generator, the latter being connected for exciting the field windings of said generators, both generators supplying current of fixed characteristics to said instruments, and solenoid operated means responsive to variations in the voltage generated by said D. C. generator for varying said resistance to maintain the speed of said motor constant.

3. Means for providing a constant voltage, constant frequency supply for electrical instruments from a variable A. C. supply comprising a motor generator set adapted to be driven from said supply including an induction motor, a carbon pile resistance in the rotor circuit thereof, a generator driven thereby for supplying current of fixed characteristics to the instrument load, a source of D. C. the voltage of which varies with the speed of said generator, said source of D. C. serving to excite said generator, and a solenoid operated by said source of D. C. for varying the pressure on said carbon pile in accordance with the voltage of said D. C. source.

4. In a device of the character described, an A. C. motor connected to a variable voltage and variable current source of supply, said motor having a carbon pile resistance connected in its rotor circuit, solenoid operated means for varying the effective resistance of said carbon pile resistance, an A. C. generator and a D. C. generator connected to said motor to be driven thereby, said D. C. generator serving to supply operating current to the field windings of both of said generators and to said solenoid operated means, so that the latter causes said motor to operate at a substantially constant speed, whereby said generators are caused to deliver electrical energy of constant characteristics for supplying A. C. and D. C. instruments.

ERIC C. SPARLING.